(12) United States Patent
Hazard

(10) Patent No.: US 9,922,286 B1
(45) Date of Patent: Mar. 20, 2018

(54) DETECTING AND CORRECTING ANOMALIES IN COMPUTER-BASED REASONING SYSTEMS

(71) Applicant: Hazardous Software Inc., Raleigh, NC (US)

(72) Inventor: Christopher James Hazard, Durham, NC (US)

(73) Assignee: Diveplane Corporation, Raleigh, NC (US)

(*) Notice: Subject to any disclaimer, the term of this patent is extended or adjusted under 35 U.S.C. 154(b) by 0 days.

(21) Appl. No.: 15/681,219

(22) Filed: Aug. 18, 2017

(51) Int. Cl.
*G06N 5/02* (2006.01)
*G06F 17/30* (2006.01)

(52) U.S. Cl.
CPC ....... *G06N 5/025* (2013.01); *G06F 17/30539* (2013.01)

(58) Field of Classification Search
CPC .. G06N 5/025; G06N 5/022; G06F 17/30539; G06F 15/18
USPC .................................................. 706/46–47
See application file for complete search history.

(56) References Cited

U.S. PATENT DOCUMENTS

| | | | | |
|---|---|---|---|---|
| 9,489,635 | B1* | 11/2016 | Zhu | G06N 99/005 |
| 2016/0055427 | A1* | 2/2016 | Adjaoute | G06N 99/005 |
| | | | | 706/12 |
| 2017/0012772 | A1* | 1/2017 | Mueller | H04L 9/0875 |
| 2017/0053211 | A1* | 2/2017 | Heo | G06N 99/005 |
| 2017/0236060 | A1* | 8/2017 | Ignatyev | G06N 5/02 |
| | | | | 706/46 |

OTHER PUBLICATIONS

Shinozaki Masahisa et al., "Detector, correction system, detection method and program", JP 2015-232847 A, Published on Dec. 24, 2015.*

* cited by examiner

*Primary Examiner* — Dave Misir
(74) *Attorney, Agent, or Firm* — Hickman Palermo Becker Bingham LLP

(57) ABSTRACT

Techniques for detecting and correcting anomalies in computer-based reasoning systems are provided herein. The techniques can include obtaining current context data and determining a contextually-determined action based on the obtained context data and a reasoning model. The reasoning model may have been determined based on multiple sets of training data. The techniques may cause performance of the contextually-determined action and, potentially, receiving an indication that performing the contextually-determined action in the current context resulted in an anomaly. The techniques include determining a portion of the reasoning model that caused the determination of the contextually-determined action based on the obtained context data and causing removal of the portion of the model that caused the determination of the contextually-determined action, to produce a corrected reasoning model. Subsequently, second context data is obtained, a second action is determined based on that data and the corrected reasoning model, and the second contextually-determined action can be performed.

13 Claims, 4 Drawing Sheets

DETECTING AND CORRECTING ANOMALIES IN COMPUTER-BASED REASONING SYSTEMS

FIELD OF THE INVENTION

The techniques described herein relate to computer-based reasoning systems, and in particular to correcting anomalies in such systems.

BACKGROUND

Many systems are controlled by machine learning systems. A common issue with such systems, however, is that when there is an anomalous outcome, such as a system failure, unexpected action, etc., there is no way to know why the system acted in the manner in which it did. For example, in a machine learning system to detect letters or numbers in images, tens or hundreds of thousands of training data (e.g., pictures along with coded letters or numbers) might be used to train the system. The system can then be used to act on incoming images to find letters and numbers in those images. At times, those outcomes might be anomalous. For example, the system may "find" letters or numbers that are not actually in the images, find incorrect letters or numbers, or fail to find letters or numbers in the images.

An issue with such systems, especially in the face of such anomalous results, is that it is difficult, if not impossible, to determine what training data caused the system to act anomalously. Therefore, it might not be possible to remove training data that caused the anomalous result from the machine learning model.

Techniques herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for obtaining context data for detecting and correcting anomalies in computer-based reasoning systems. Various of the techniques described herein, which may be systems, methods, or non-transient computer-readable media, include obtaining current context data and determining a contextually-determined action based on the obtained context data and a reasoning model. The reasoning model may have been determined based on multiple sets of training data, which include multiple context data and action data pairings. The techniques may proceed by causing performance of the contextually-determined action and, potentially, receiving an indication that performing the contextually-determined action in the current context resulted in an anomaly. The techniques include determining a portion of the reasoning model that caused the determination of the contextually-determined action based on the obtained context data and causing removal of the portion of the model that caused the determination of the contextually-determined action, in order to produce a corrected reasoning model. Subsequently, data for a second context is obtained and a second action is determined based on the obtained subsequent contextual data and the corrected reasoning model, and the second contextually-determined action can be performed.

The reasoning model may be a case-based reasoning model.

In some embodiments, determining the contextually-determined action includes determining closest context data in training data that is closest to the current context, determining the contextually-determined action includes determining an action paired with the closest context data, and/or determining the previously-identified closest context data in the training data. Some embodiments include determining the closest context data using a Minkowski distance measure, potentially of order zero.

In some embodiments, the removal of the portion of the model that caused the determining of the contextually-determined action to produce the corrected reasoning model includes removing an association between the previously-identified closest context data and the action paired with the closest context data, removing the closest contextual data and the paired action, and/or determining additional portions of the reasoning model that would cause the performance of the contextually-determined action in the current context and removing the additional other portions of the reasoning model.

DETAILED DESCRIPTION

Figure 1:
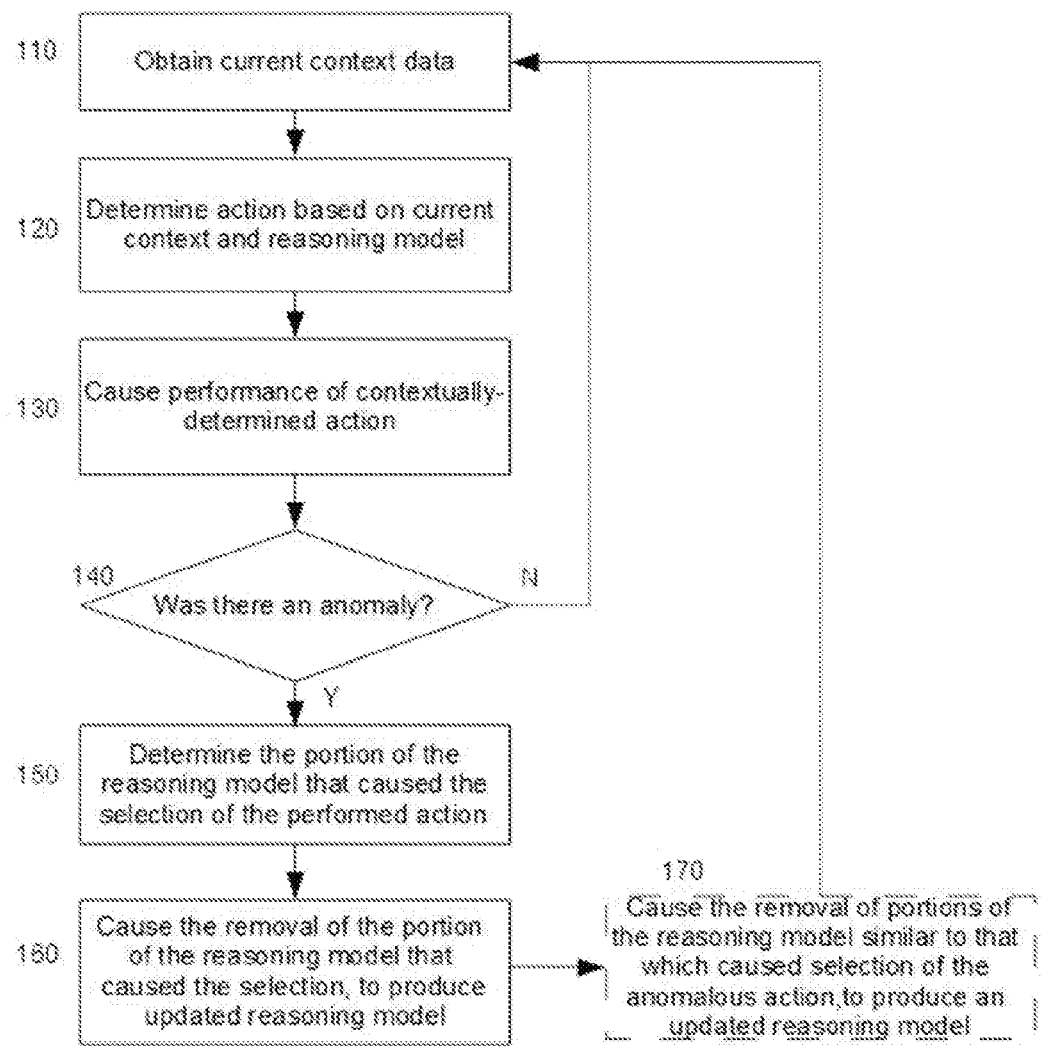
FIG. 1 depicts example processes for detecting and correcting anomalies in computer-based reasoning systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Consider, for example, an embodiment of the techniques described herein that uses a reasoning engine to controlling a self-driving car. The system may be trained using a set of training data (a set of input or system contexts paired with actions taken) to generate the reasoning model used in the reasoning system. An example of such a context-action pairing could be: when the next navigation action will be a left turn and the vehicle is not in the left lane (the context), the vehicle will slow down and move a lane to the left (the action). To keep the example simple, the discussion will be limited to this context, but the context is likely to include many other factors, such as distance to the turn, current speed, the weight of the vehicle, placement of other vehicles, placement of items to be avoided, obstacles around the vehicle, weather conditions, visibility ranges of the sensors, etc. Returning to the example, after the reasoning model is built on many such context/action pairs, and the reasoning model is available for use, a current context may be received and the reasoning model may be used to determine an action to take. The current context (e.g., a subsequent turning left, and not being in the leftmost lane) can be matched with previous training contexts to determine a most appropriate decision based on the context (e.g., slow down and move one lane to the left).

Continuing with the same example embodiment, when an anomalous result occurs, for example, the self-driving car moves a lane to the right when the next navigation event is a left turn, the system can pinpoint the training context-action pair that caused the action. The pinpointed training pair would likely be training data where someone trained the system to move a lane to the right before turning left. In some embodiments, that training context-action pair, and possibly other identical or similar training context-action pairs, may be removed from the reasoning model. With these context-action pair(s) removed and any necessary processing is done, the reasoning model will be updated to ensure it does not make that decision again in that context, baring other reasons to make that same decision in that same context. That is, the system will no longer move a lane to the right before making a left turn.

The self-driving car example is discussed throughout herein, and it can encompass numerous potential embodiments. For example, the training data may be collected on a simulator, in a real car, in multiple types of cars, in multiple types of vehicles, by observation, and/or in any other appropriate manner. Causing performance of later-identified actions can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Example Processes for Detecting and Correcting Anomalies in Reasoning Systems

Process 100 of FIG. 1 shows example embodiments of detecting and correcting anomalies in computer-based reasoning systems. In various embodiments, process 100 will take place after the reasoning model is built (example of which are discussed with respect to process 200, FIG. 2, and elsewhere herein). More details, and additional alternatives are described below, but as a simple example, in block 110 context data related to the current location and status of a self-driving car, are received. Once context data is received, then in block 120, a reasoning model is used to determine an action to take based on the received context data. In the self-driving car example, this might be directing the self-driving car to get into the left lane based on the context that the next navigation action is turning left. In block 130, the performance of the selected action takes place, which, in the example would be moving a lane to the left. If an anomaly is not detected in block 140, then the process returns to block 110 to receive the next context information. An anomaly might be, for example, detection that even though there is an upcoming left turn, the action taken was to move a lane to the right instead of moving a lane to the left.

If an anomaly is detected in block 140, then the system will determine the training data that caused the anomaly. Further, in block 150, the training data that caused the anomalous event is removed. Some embodiments will also look for similar context-action pairs that would cause the reasoning system to select the same anomalous action, and remove those in block 170.

Returning again to process 100 for more a detailed description of various embodiments, in block 110, current context data is obtained. The current context data can include any data that is pertinent to the decisions being made in the system. The context data being collected will typically be consistent across all of the training data being collected, although that does not necessarily need to be the case in every instance, set of training data, or embodiment.

If, for example, the reasoning system is being used for self-driving car control, the current context data may include, speed of vehicle, location, position (lane) on the road, whether there are objects detected in front, on the sides, or behind the car (and the velocities, accelerations, and estimated identities of those objects, such as person, car, plastic bag, etc.); current speed; speed limit; direction of travel; next navigation instruction; whether the vehicle has a person inside; current acceleration; possible acceleration; distance the vehicle's sensors can detect; whether there are any obstructions to the sensors; as well as many others.

The current context data can be obtained in any appropriate manner. For example, the data may be collected automatically from sensors on the vehicle, from operations systems within the vehicle; from databases or other storage structures or devices; etc. Some or all of the training data may also be input or modified manually by a human operator. For example, in the self-driving car control context, the current speed may be obtained from a sensor; range of sensors may be obtained from a configuration file or calibration database describing the sensors; next navigation instruction may be obtained from an integrated or separate navigation system; the weight of the car may be obtained from a database; etc.

The current context data might be obtained in response to an event and/or obtained at regular intervals. For example, in the self-driving car example, the event triggering the obtainment of context data could be receiving an indication that a new object is detected by the sensors, or that an object is no longer being detected by the sensors. For example, if a new object (e.g., car, human, animal, or plastic bag) is detected by the sensors of a self-driving car, then current context data may be obtained. Further, in some embodiments, context data is stored for previous time periods or intervals, and, upon detection of an event (such as detecting a new object in the self-driving car context), context data from one or more previous time periods is also obtained in block 110. In some embodiments, current context data is obtained at regular intervals, such as every 0.03, 1, 2, 10, 37, 100, or 1000+ milliseconds. In yet other embodiments, context data may be obtained at regular intervals and in response to particular events, as described above.

In block 120, an action to take in the system may be determined based on the current context data. Determining the action might include using current context data as an input to the reasoning system in order to determine what action to take. Various embodiments of training of a reasoning system are described with respect to process 200 and additionally elsewhere herein.

In some embodiments, the reasoning system is a case-based reasoning system. In such embodiments, determining an action based on a current context may include using the case-based reasoning system to find closest training contexts to the current context to determine the action associated with that closest action.

Determining the closest context-action pair in a case-based reasoning system may include using a "distance" measure to compare training contexts to find a training context with the closest or most similar training context to the current context. The distance measure can be any appropriate calculation. Distance measures used in various embodiments include Jaccard index, Tanimoto similarity, Damerau-Levenshtein distance, and Minkowski distance. For example, in embodiments where a Jaccard index is used to determine similarity of the current context and the training contexts, a Jaccard index or Tanimoto similarity score could be determined for one or more (or all) of the training contexts with respect to the current context, and the training context with the minimum Jaccard index or Tanimoto similarity could then be selected as the closest training context. In the embodiments where Damerau-Levenshtein distance, which may be a measure of the number of operations that would be needed to transform one set of context data into another, is used, then block 120 may include determining the Damerau-Levenshtein distance for one or more (or all) of the training contexts with respect to the current context, and the training context with the minimal Damerau-Levenshtein distance may be selected. In embodiments where a Minkowski distance is used to determine similarity scored, the Minkowski distance between two or more of the training contexts may be determined, and the training context with the lowest Minkowski score may be selected. In various embodiments, the order of the Minkowski distance may be high (such as order 3 or above), may be in the middle range (order 1-3), or may be low, below 1, or even approach or be at order 0 (zero). The choice or order of the Minkowski distance may be based on the type of context data, the size of the context data space, the computational cost of computing the distance, or other factors. The distance measure may also be calculated based on a cosine similarity measure, such as the Ochiai coefficient or the Soft cosine measure.

The choice of which (and how many) training contexts to compare to the current context can be made based on determining whether a training context may be close enough to be considered a candidate, thereby possibly saving computation cycles, or all training contexts may be compared to the current context in order to ensure that the training context with the minimal distance to the current context is selected. If two or more training contexts have the same distance measure, the system may choose the first identified training context as the selected training context, or may use any other measure or technique to choose among the identically-scored contexts.

Regardless of the similarity metric used, once a training context is selected in a case-based reasoning system, the action associated with the selected training data may be selected in block 120.

Figure 3:
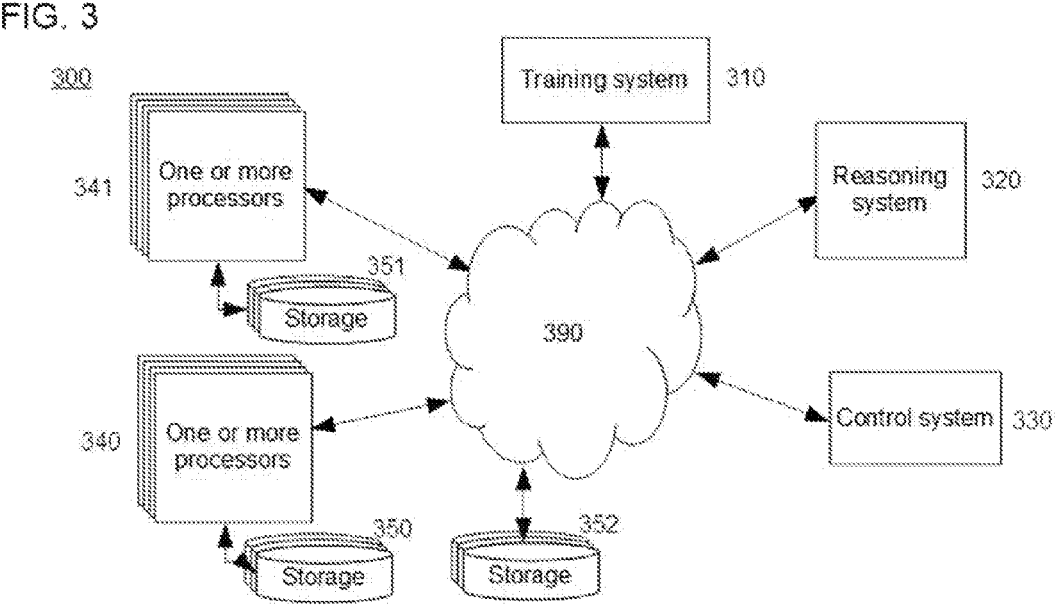
FIG. 3 depicts example systems for detecting and correcting anomalies in computer-based reasoning systems.

After determining which action to take in block 120, the selected or determined action can be performed or caused to be performed in block 130. Referring to FIG. 3, causing the action to be performed might include, sending a signal with an indication of an action to be performed to one or more control systems 330. If the control system 330 is integrated with the reasoning system 320, then it might be more actuate to describe block 130 as the combined reasoning system 320 and control system 330 performing (vs. causing to be performed) the action. In which case, the portion of the integrated system depicted as the reasoning system 320 could cause the portion of the integrated system depicted as the control system 330 to cause performance of the action.

Turning back to the example of a self-driving car, if the selected training context (in block 120) is associated with an action to move into a lane to the right, then, in block 130, the action to move into a lane to the right can be sent to a control system 330 within the self-driving car in order to cause it to switch lanes into the lane to the right.

In block 140, after the selected action has been performed, or has been caused to be performed, as part of block 130, a determination is made whether an anomaly has occurred based on that action. Detecting an anomaly may include receiving a signal from part of the system or from another system that indicates an anomaly has occurred. In some embodiments, detecting an anomaly in block 140 may include receiving an indication from a user or operator of the system. For example, turning to FIG. 3, and the self-driving car example, if an action is sent to control system 330 to cause a vehicle to switch one lane to the right in a context where the next navigation instruction is a left turn, then an anomaly may be detected and/or flagged to the reasoning system 320 as part of block 140. This anomaly may be flagged by, for example, reasoning system 320, control system 330, a system or component not pictured in FIG. 3 such as an anomaly detection system, and/or by a human user or operator (not pictured in FIG. 3). In some embodiments, anomalies may be detected in real time and/or after occurrence. For example, some anomalies may be detected by systems as described above, in real time or nearly real time. The same or other anomalies may be detected after the fact by review of logs, responding to user comments or complaints, etc.

Returning to the self-driving car example, an anomaly of switching a lane to the right may be detected automatically by a system within the car, detected later by automated review of the self-driving trip, and/or flagged based on passenger or other human input.

In some embodiments, a determination is made (block 140) whether a contextually-determined action would cause an anomaly (block 130) by simulating the action to be performed. For example, a simulator may be used to perform the action (such as a driving simulator in the self-driving car example), and an anomaly may be detected based on the actions taken in the self-driving car simulator. As another example, a simulator can determine the results of actions, and this can happen even if not with graphics, but purely by determining the actions to be taken and looking for anomalies in those actions.

If no anomaly is detected in block 140, then the system can proceed to block 110 without modifying the reasoning model. If an anomaly is detected in block 140, then in block 150 the system can determine which portion of the reasoning model caused the selected action. For example, if the reasoning system is a case-based reasoning system, a particular training context will have been selected in block 120 and that particular training context may be determined in block 150. Determining which context data caused the selection of the anomalous action may include determining what training context was selected in block 120. In other embodiments, the training context causing the anomalous action might be determined in other ways, such as searching the training contexts for the nearest context to the current context (similar to what is described above with respect to block 120). Such embodiments may search for all context-action pairs that would have caused selection of the anomalous action. As described below, in some embodiments, all such context-action pairs might then be removed in block 170.

Once the training data that caused the anomalous action to be taken is determined in block 150, then in block 160, the system can cause the removal of the portion of the reasoning model that caused the selection of the action to be taken. For example, if the reasoning model is a case-based reasoning model, the particular training context may be determined in block 150 can be removed from the training context-action pair data in block 160. Further, in some embodiments, additional context-action pairs are removed in block 170. The additional context-action pairs to remove might be selected based on identifying those that would cause the same action to be taken in the same context. Various embodiments of removing training data from a reasoning model are described with respect to process 200 in FIG. 2 and elsewhere herein.

Whether or not additional portions of the reasoning model are removed or updated in block 170, the process 100 may recommence in block 110, receiving input contexts, determining actions to take based on the context (block 120), causing the action to be taken (block 130), detecting any anomalies (block 140), and, if anomalies are detected, removing the portions of the reasoning model that caused the detection of those anomalies (blocks 150-170).

Example Processes for Creating and Updating Reasoning Systems

Figure 2:
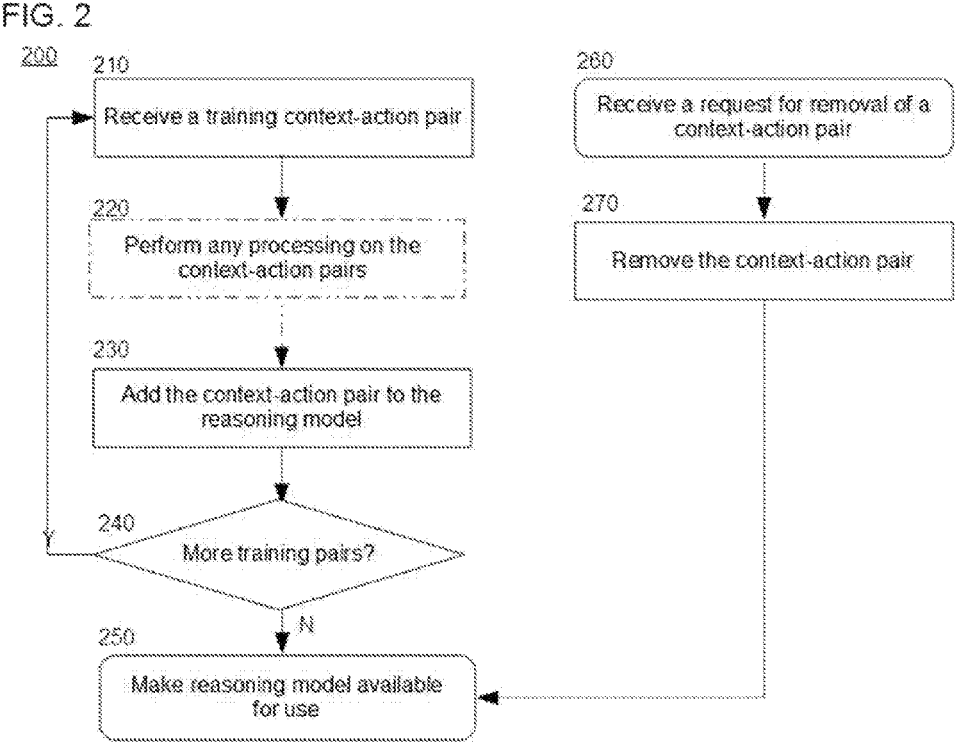
FIG. 2 depicts example processes for creating and updating reasoning systems.

FIG. 2 depicts second example processes 200 creating and updating reasoning systems.

To summarize some embodiments of process 200, in block 210, a training context-action pair is received (block 210), optionally processed (block 220), and added to the reasoning model (block 230). In block 240, a determination is made whether more training data is going to be added to a model, and, if so, returns to block 210. If not more training data will be added to the reasoning model, then the reasoning model is made available for use (block 250).

When anomalies are detected (see, e.g., process 100) or should otherwise be removed from the reasoning model, process 200 includes receiving a request to remove a context-action pair from the reasoning model (block 260) and removing the requested context-action pair from the model in block 270. After the context-action pair is removed in block 270, any necessary processing is performed in block 230 (not pictured), and the reasoning model is finalized and made available in block 250.

Turning to the example of a self-driving car, blocks 210-250 may be used to build a reasoning model based on training data, and when an anomaly is detected, such as switching a lane to the right before making a left turn, blocks 260-270 may be used to remove training data to ensure that anomaly is no longer performed when such a related context appears.

Returning again to process 200 for more detailed description, in block 210, current context data-action pairings are obtained. The current context data can include any data that is pertinent to the decisions being made (e.g., the reasoning) in the system. The context data and action paring being collected will typically be consistent across all of the training data being collected, although that does not necessarily need to be the case in every instance, set of training context data, or in every system.

If, for example, the reasoning system is being used for self-driving car control, the context data may include, speed of vehicle, location, position (lane) on the road, whether there are objects detected in front, on the sides, or behind the car (and the velocities, accelerations, and estimated identities of those objects, such as person, car, plastic bag, etc.); current speed; speed limit; direction of travel; next navigation instruction; whether the vehicle has a person inside; desired driving style of passenger; current acceleration; possible acceleration; distance the vehicle's sensors can detect; whether any obstructions to the sensors; as well as many others. As discussed elsewhere herein, the current context data can be obtained in any appropriate manner and may be obtained in response to an event and/or obtained at regular intervals. For example, in some embodiments, the context data may be obtained based on detection of an object in the road.

In some embodiments, more than one action is associated with a given context. For example, in the self-driving car example, when the next navigation instruction is to turn left, the actions to be taken may include switching a lane to the left (action 1) as well as slowing down the vehicle (action 2). Each of these actions may be associated with a similar or identical context and received as part of block 210.

In some embodiments, the action to be taken is also part of the context for the current action, or is part of context-action pairs for subsequent actions. For example, the context of a left turn in a self-driving car may include that a previous context-action training data pair included slowing down, and the current context may include switching to the left lane after the slowing of the car has already occurred.

Adding the received context-action pair to the reasoning model may include or be proceeded by, as depicted by optional block 220, processing all or some of the data related to the received context (and/or all or some of the received action(s)). As an example of processing all or some of the data, would be reducing the data stored. The received context may include thousands of data fields, and storing the context in association with the action may include storing all of those data items. In some embodiments, the received context data is pared down before it is added to the reasoning model with its action pairing as part of block 220. Certain embodiments include reducing the amount of data associated with an action added to the reasoning model, which may also occur as part of block 220. Other examples, from various embodiments, of processing data that may be included as part of block 220 include normalizing data, combining or splitting up context or action data, and the like. Not depicted in FIG. 2, processing of context-action pairs may, instead of or in addition, occur after no more context-action pairs are received and before the model is made available in block 250.

In block 230, the context-action pair received in block 210, and optionally processed in block 220, is added to the reasoning model. Adding a context-action pair to the reasoning model may include storing the data in one or more databases or other structures, creating key or hash tables related to the data, and the like. In some embodiments, context-action pairs are stored based on criteria, such as similarity to other context-action pairs. Such storage may be in tree or other structures, which may be chosen for various computational and searching efficiency reasons.

In block 240, if there is more training data to include in the reasoning model, the process may return to block 210. If there is no more training data to include in the reasoning model, then the process may make the reasoning model available in block 250.

Making the reasoning model available in block 250 may include any appropriate actions for making the model available for use, including making the reasoning model available as part of a reasoning system, such as reasoning system 320 of FIG. 3. For example, in some embodiments and in the context of FIG. 3, making the model available for use may include moving or copying the model to other storage 350-352. In some embodiments, more processing may be needed in order to make the reasoning model available for use. For example, the reasoning model may be processed in a way to make searching or calculating distances (see, e.g., block 120) more efficient. In yet other embodiments, making the reasoning model available may include indicating to systems and or users that the reasoning model is available.

Returning to block 260, a request to remove training context-action pairs is received. Numerous example embodiments of receiving such a request are discussed throughout herein. After the request to remove the training context-action pair is received in block 260, that training data is removed from the reasoning model in block 270. Removing the context-action pair from the reasoning model may include updating the entire reasoning model, a portion of the reasoning model, or removing just the context-action pair from the reasoning model. For example, in a case-based reasoning system, the requested context-action pair may be deleted from a case-based reasoning model in the case based reasoning system.

Variously, only the requested context-action pair may be removed from reasoning system and its underlying model. In some embodiments, additional context-action pairs may also be removed in addition to the context-action pair for which removal was requested. The selection of additional context-action pairs may be based on the similarity of the additional context-action pairs to the context-action pair indicated for removal. For example, if an identical or substantially-similar context-action pair exists as part of the reasoning model, it may be removed in addition to the requested pair. The determination of identity and substantial similarity may be based on any measure, including those techniques described with respect to block 120, such as the Jaccard index, Tanimoto similarity, Damerau-Levenshtein distance, and Minkowski distance.

In some embodiments, finding additional context-action pairs includes matching only a relevant portion of the context and/or only a relevant portion of the action with the context-action pair requested for removal. For example, using the left turn self-driving car example, the system may look only to whether additional context-action pairs have the next navigation instruction as a left turn and an indicated action as moving right one lane. Much additional context may be associated with context-action pair. For example speed, weight of car, etc. Even if the speed, weight of car, etc. in the additional context-action pairs do not match those of the context-action pair requested for removal, those partially-matching additional context-action pairs might still be selected in block 260 for removal in block 270.

In some embodiments, one or more context-action pairs may be updated instead of removed in block 270 (not depicted in FIG. 2). For example, the context-action pair for which removal was requested might be modified cause performance of an action other than the anomalous action, and the reasoning system can then be updated based on the updated context-action pair. In the context of the self-driving car example, if appropriate, the context-action pair that caused the car to move a lane to the right before turning left might be updated to slow down and move a lane to the left before turning left, and the reasoning system could be updated to include this updated context-action pair.

After the requested context-action pair, and any similar pairs as applicable, are removed in block 270, the reasoning model will be made available in block 250, which is described elsewhere herein.

Referring back to FIG. 3 and the self-driving car example, if an anomaly is detected (block 140), such as moving a lane to the right before turning left, then a request to remove the training data associated with that movement may be received in block 260, and that data may be removed in block 270. Further, other pairs that would cause the car to move a lane to the right before turning left (e.g., as determined by the similarity to the context-action pair requested for removal) may also be removed. Once the context-action pair that caused the anomalous action, and, optionally, similar context-action pairs, are removed, the reasoning model may again be made available in block 250, for example as part of a reasoning system such as reasoning system 320 of FIG. 3.

Example Systems for Detecting and Correcting Anomalies

System 300 in FIG. 3 shows example systems for detecting and correcting anomalies in computer-based reasoning systems. System 300 includes a training system 310 that may be used to collect training data for building the reasoning model. In some embodiments, the training system 310 constructs a reasoning model for use by the reasoning system 320. In some embodiments, the reasoning model may be constructed by one or more processors 340 and/or 341, the reasoning system 320, a combination of systems and/or processors, and/or any other appropriate system, even if not pictured in FIG. 1. The collection of training data and creation of reasoning models is discussed additionally elsewhere herein.

The system 300 also includes a reasoning system 320 which can be used to determine what action to take in a given context. Determining the action to take based on a particular context is described additionally elsewhere herein. The system 300 also includes a control system 330, which may be used to perform the actions selected by the reasoning system 320. The system 300 also includes one or more sets of processors 340-341, which may be used for processing of data, contexts, and the like. The various components of system 300 may be communicatively coupled and/or connected by one or more networks, such as that depicted by network 390. They may also be connected via a communication bus, dedicated hardware, or any other appropriate mechanism, such as those described elsewhere herein. Each component of system 300 may also have access to one or more storage system or devices 350-352. Although storage 350-352 are depicted as connected to only the networks and processors 340-341, storage 350-352 may be local, cloud-based, or virtual and may be directly or virtually connected to or embedded in any component in system 300. Further, the system may have two or more of any subsystem, such as the reasoning system 320 and the control system 330.

In the context of an example system 300 for self-driving cars, there may be a single control system 330, or multiple control systems 330 for various parts of the car. The training system 310 may be used to train the reasoning system 320 on how to control the self-driving car using the control system(s) 330.

Throughout herein, an example of self-driving cars tuning left was used. The description has been simplified to highlight the advantages of the techniques described herein. The actual context of such a decision might be significantly more complex than described. Further, the techniques herein are useful in other contexts besides self-driving cars. Any system that has a tractable context space could be a candidate for using the techniques described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
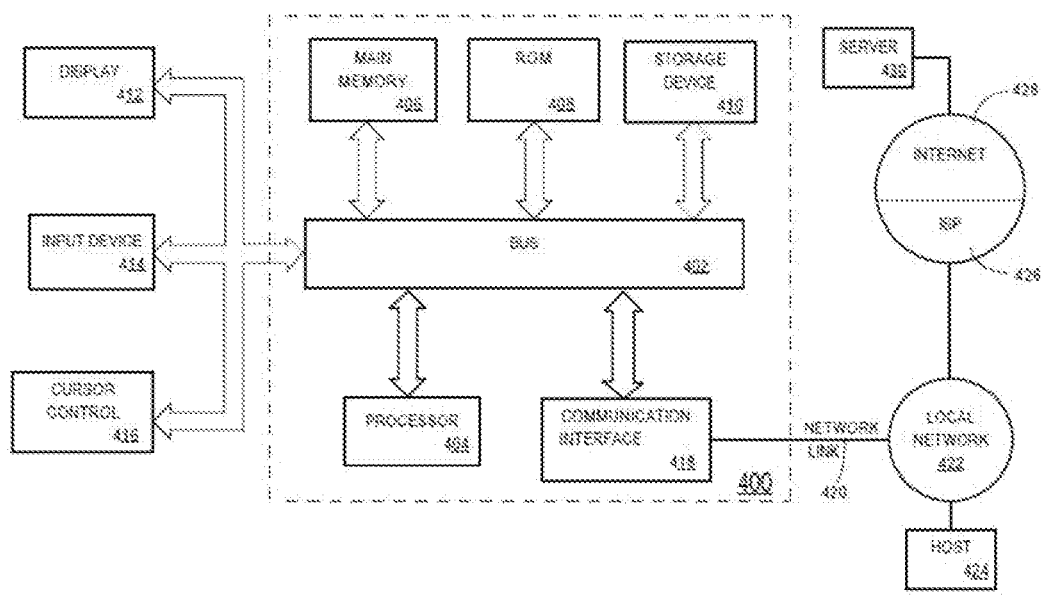
FIG. 4 depicts additional example systems and hardware for detecting and correcting anomalies in computer-based reasoning systems.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining, using one or more computing devices, context data for a current context of a self-driving vehicle;
   determining, using the one or more computing devices, a contextually-determined action for the self-driving vehicle based on the obtained context data and a reasoning model, wherein the reasoning model was determined based on multiple sets of training data, wherein the multiple sets of training data include multiple context data and action data pairings, and wherein determining the contextually-determined action for the self-driving vehicle comprises determining, using a premetric, closest context data in the multiple sets of training data that is closest to the current context based on the premetric and determining an action paired with the closest context data as the contextually-determined action for the self-driving vehicle, wherein the premetric is a Minkowski distance measure of order zero;
   determine, using the one or more computing devices, whether performance of the contextually-determined action results in an indication of an anomaly for the self-driving vehicle;
   determining, using the one or more computing devices, a portion of the reasoning model that caused the determination of the contextually-determined action that resulted in the indication of the anomaly for the self-driving vehicle based on the obtained context data;
   updating, using the one or more computing devices, the portion of the reasoning model that caused the determination of the contextually-determined action that resulted in the indication of the anomaly for the self-driving vehicle, in order to produce a corrected reasoning model;
   obtaining, using the one or more computing devices, subsequent contextual data for a second context for the self-driving vehicle;
   determining, using the one or more computing devices, a second contextually-determined action for the self-driving vehicle based on the obtained subsequent contextual data and the corrected reasoning model; and
   causing performance, using the one or more computing devices, of the second contextually-determined action for the self-driving vehicle.

2. The method of claim 1, wherein the reasoning model is a case-based reasoning model.

3. The method of claim 1, wherein determining the portion of the reasoning model that caused the determining of the contextually-determined action that resulted in the indication of the anomaly comprises determining the previously-identified closest context data in the training data.

4. The method of claim 3, wherein updating the portion of the reasoning model that caused the determining of the contextually-determined action that resulted in the indication of the anomaly to produce the corrected reasoning model comprises removing an association between the previously-identified closest context data and the action paired with the closest context data.

5. The method of claim 1, wherein updating the portion of the reasoning model that caused the determining of the contextually-determined action that resulted in the indication of the anomaly to produce the corrected reasoning model comprises removing the closest context data and the paired action.

6. The method of claim 1, wherein the method additionally comprises determining additional portions of the reasoning model that would cause the performance of the contextually-determined action that resulted in the indication of the anomaly in the current context and removing the additional portions of the reasoning model.

7. One or more non-transitory storage media storing instructions which, when executed by the one or more computing devices, cause performance of the method recited in claim 1.

8. A system for performing a machine-executed operation involving instructions, wherein said instructions are instructions which, when executed by one or more computing devices, cause performance of certain steps including:
   obtaining context data for a current context of a self-driving vehicle;
   determining a contextually-determined action for the self-driving vehicle based on the obtained context data and a reasoning model, wherein the reasoning model was determined based on multiple sets of training data, wherein the multiple sets of training data include multiple context data and action data pairings, and wherein determining the contextually-determined action for the self-driving vehicle comprises determining, using a premetric, closest context data in the multiple sets of training data that is closest to the current context based on the premetric and determining an action paired with the closest context data as the contextually-determined action for the self-driving vehicle, wherein the premetric is a Minkowski distance measure of order zero;
   determine whether performance of the contextually-determined action results in an indication of an anomaly for the self-driving vehicle;
   determining a portion of the reasoning model that caused the determining of the contextually-determined action that resulted in the indication of the anomaly for the self-driving vehicle based on the obtained context data;
   updating the portion of the reasoning model that caused the determining of the contextually-determined action that resulted in the indication of the anomaly for the self-driving vehicle based on the obtained context data in order to produce a corrected reasoning model;

obtaining subsequent contextual data for a second context for the self-driving vehicle;

determining a second contextually-determined action for the self-driving vehicle based on the obtained subsequent contextual data and the corrected reasoning model; and causing performance of the second contextually-determined action for the self-driving vehicle.

9. The system of claim 8, wherein determining the portion of the reasoning model that caused the determining of the contextually-determined action that resulted in the indication of the anomaly comprises determining the previously-identified closest context data in the training data.

10. The system of claim 8, wherein updating the portion of the reasoning model that cause the determining of the contextually-determined action that resulted in the indication of the anomaly to produce the corrected reasoning model comprises removing the portion of the reasoning model associated the closest context data, and the action paired with the closest context data.

11. The system of claim 8, wherein updating the portion of the reasoning model that cause the determining of the contextually-determined action that resulted in the indication of the anomaly to produce the corrected reasoning model comprises changing the action paired with the closest context data.

12. The system of claim 8, wherein the performed steps additionally comprise determining additional portions of the reasoning model that would cause the performance of the contextually-determined action that resulted in the indication of the anomaly and removing the additional portions of the reasoning model.

13. The system of claim 8, wherein the reasoning model is a case-based reasoning model.

\* \* \* \* \*